United States Patent
Yoo

(10) Patent No.: US 11,301,704 B2
(45) Date of Patent: Apr. 12, 2022

(54) METHOD AND APPARATUS WITH IMAGE RECOGNITION

(71) Applicant: SAMSUNG ELECTRONICS CO., LTD., Suwon-si (KR)

(72) Inventor: Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 16/661,394

(22) Filed: Oct. 23, 2019

(65) Prior Publication Data

US 2020/0151481 A1 May 14, 2020

(30) Foreign Application Priority Data

Nov. 12, 2018 (KR) .................. 10-2018-0138310

(51) Int. Cl.
| | | |
|---|---|---|
| *G06K 9/00* | (2006.01) | |
| *G06F 16/535* | (2019.01) | |
| *G06K 9/62* | (2022.01) | |
| *G06N 3/04* | (2006.01) | |
| *G06N 3/08* | (2006.01) | |

(52) U.S. Cl.
CPC ....... *G06K 9/00906* (2013.01); *G06F 16/535* (2019.01); *G06K 9/00288* (2013.01); *G06K 9/6256* (2013.01); *G06N 3/0454* (2013.01); *G06N 3/08* (2013.01)

(58) Field of Classification Search
CPC ............. G06K 9/00906; G06K 9/6256; G06K 9/00288; G06K 9/6227; G06K 9/6271; G06K 9/627; G06F 16/535; G06F 16/532; G06F 16/5854; G06F 16/583; G06N 3/0454; G06N 3/08; G06N 3/0472

USPC ..... 382/118; 704/9, 235; 707/769, 752, 753, 707/805, 759, 736, 770; 705/14.54
See application file for complete search history.

(56) References Cited

U.S. PATENT DOCUMENTS

| | | |
|---|---|---|
| 9,786,084 B1 | 10/2017 | Bhat et al. |
| 2016/0188565 A1* | 6/2016 | Robichaud .......... G06F 16/3334 704/9 |
| 2017/0169057 A1* | 6/2017 | Barel ...................... G06N 20/00 |
| 2017/0278135 A1 | 9/2017 | Majumdar et al. |
| 2017/0351952 A1 | 12/2017 | Zhang et al. |
| 2018/0095643 A1 | 4/2018 | Jia et al. |
| 2018/0101742 A1 | 4/2018 | Burge et al. |

(Continued)

FOREIGN PATENT DOCUMENTS

KR   10-2017-0137350 A   12/2017

OTHER PUBLICATIONS

Zhu, J et al., "Unpaired Image-to-Image Translation Using Cycle-Consistent Adversarial Networks" *Proceedings of the IEEE International Conference on Computer Vision*, 2017, pp. 2223-2232 (10 pages in English).

(Continued)

*Primary Examiner* — Charlotte M Baker
(74) *Attorney, Agent, or Firm* — NSIP Law

(57) ABSTRACT

A processor-implemented recognition method includes: receiving query input data; determining a domain to which the query input data belongs using a neural network-based classifier; and in response to the query input data belonging to a first domain, generating second query data of a second domain based on the query input data.

18 Claims, 9 Drawing Sheets

(56) References Cited

U.S. PATENT DOCUMENTS

2018/0101770 A1 4/2018 Tanaka et al.
2019/0122072 A1* 4/2019 Cricr .................... G06K 9/6277

OTHER PUBLICATIONS

Dumoulin, V. et al., "Adversarially Learned Inference", arXiv:1606.00704v3, Feb. 21, 2017, pp. 1-18 (18 pages in English).
Odena, A et al., "Conditional Image Synthesis with Auxiliary Classifier GANs", arXiv:1610.09585v4, Jul. 20, 2017, pp. 1-12 (12 pages in English).
Isola, P et al., "Image-to-Image Translation with Conditional Adversarial Networks", arXiv:1611.07004v2, Nov. 22, 2107, pp. 1-17 (17 pages in English).
Choi, B. et al., "Least Squares Generative Adversarial Network-Based Postfiltering for Speech Synthesis", *Korean Institute of Communication Sciences 2018 Winter Conference*, 2018, pp. 1-3 (1 page in English, 2 pages in Korean.).
Yu, J. et al., "Image Super-Resolution with Text Handling Via Generative Adversarial Network", *KIISE Transactions on Computing Practices*, vol. 24, No. 8, 2018, pp. 405-409 (1 page in English, 4 pages in Korean).
Huang, X et al., "Multimodal Unsupervised Image-to-Image Translation", *Proceedings of the European Conference on Computer Vision (ECCV)*, 2018, pp. 1-18 (18 pages in English).

* cited by examiner

METHOD AND APPARATUS WITH IMAGE RECOGNITION

CROSS-REFERENCE TO RELATED APPLICATIONS

This application claims the benefit under 35 USC § 119(a) of Korean Patent Application No. 10-2018-0138310, filed on Nov. 12, 2018, in the Korean Intellectual Property Office, the entire disclosure of which is incorporated herein by reference for all purposes.

BACKGROUND

1. Field

The following description relates to a method and apparatus with image recognition.

2. Description of Related Art

A neural network may have an operation structure in which numerous processing elements having simple functions are connected in parallel. The neural network may be used in a data classification due to its problem solving capability. To address an issue of classifying an input pattern as a predetermined group, the neural network employs an algorithm with learning abilities. The neural network may generate mapping between input patterns and output patterns using the algorithm. The neural network has a generalization capability to generate a relatively correct output in response to an input pattern that has not been used for training based on a training result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented recognition method includes: receiving query input data; determining a domain to which the query input data belongs using a neural network-based classifier; and in response to the query input data belonging to a first domain, generating second query data of a second domain based on the query input data.

The method of claim 1, wherein the generating of the second query data comprises generating the second query data by inputting the query input data to a first neural network-based generator.

The method may include: training the neural network-based classifier based on the query input data and the generated second query data.

The method may include: performing recognition by determining a domain to which next query input data belongs using the trained classifier.

The method may include: in response to the query input data belonging to the second domain, generating first query data of the first domain based on the query input data.

The generating of the first query data may include generating the first query data by inputting the query input data to a second neural network-based generator.

The method may include: training the neural network-based classifier based on the query input data and the generated first query data.

The determining of the domain may include determining, using the neural network-based classifier, whether a category of an object in the query input data or a category corresponding to the query input data belongs to the first domain.

The query input data may correspond to an image sensed by one or more image sensors, and the domain to which the query input data belongs may include a category of an object included in the image.

A non-transitory computer-readable storage medium may store instructions that, when executed by one or more processors, cause the one or more processors to perform the method.

In another general aspect, a processor-implemented recognition method includes: receiving a query face image; performing a liveness test on the query face image using a neural network-based classifier; and in response to a face in the query face image being determined as a genuine face based on a result of the liveness test, generating a fake face image representing a fake face based on the query face image.

The generating of the fake face image may include generating the fake face image using a first neural network-based generator that uses the query face image as an input.

The method may include: training the neural network-based classifier based on the query face image and the generated fake face image.

In another general aspect, a processor-implemented recognition training method includes: generating, based on first training data of a first domain, second training data of a second domain; generating, based on third training data of the second domain, fourth training data of the first domain; and training a classifier based on the first training data, the second training data, the third training data and the fourth training data.

The training of the classifier may include training the classifier so that the classifier is configured to distinguish data of the first domain from data of the second domain.

The generating of the second training data may include generating the second training data by inputting the first training data to a first neural network-based generator, and the generating of the fourth training data may include generating the fourth training data by inputting the third training data to a second neural network-based generator.

The training of the classifier may include: setting a cost function based on a feature value output from the classifier; and training the classifier, the first neural network-based generator and the neural network-based second generator based on the cost function.

In another general aspect, a recognition apparatus includes: one or more processors configured to: receive query input data; determine a domain to which the query input data belongs using a neural network-based classifier; and in response to the query input data belonging to a first domain, generate second query data of a second domain based on the query input data.

The one or more processors may be configured to generate the second query data by inputting the query input data to a first neural network-based generator.

The one or more processors may be configured to generate first query data of the first domain by inputting the query input data to a second neural network-based generator, in response to the query input data belonging to the second domain.

The one or more processors may be configured to determine, using the neural network-based classifier, whether a category of an object in the query input data or a category corresponding to the query input data belongs to the first domain.

In another general aspect, a processor-implemented recognition training method includes: generating a first fake image of a first category based on a first genuine image of a second category; generating a second fake image of the second category based on a second genuine image of the first category; and training a neural network-based image classifier by inputting, to the classifier, the first and the second real images and the first and the second fake images to classify each of the images as corresponding to either one or both of the first and the second categories.

Other features and aspects will be apparent from the following detailed description, the drawings, and the claims.

Figure 1:
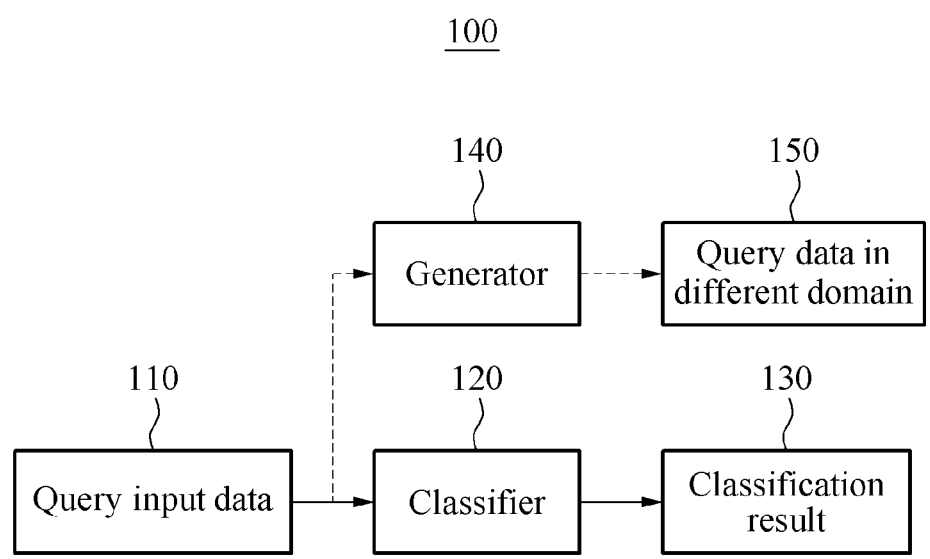
FIG. 1 illustrates an example of a data classification system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms, and are not to be construed as being limited to the examples described herein. Rather, the examples described herein may have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way.

As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a data classification system 100.

Referring to FIG. 1, the data classification system 100 may classify domains of query input data 110. The data classification system 100 may determine which domain may include the query input data 110 among N domains, wherein N is a natural number greater than or equal to "2." The query input data 110 may be input data that is to be classified in the data classification system 100, and may include, for example, image data, audio data, and/or fingerprint data. The data classification system 100 may use a neural network-based classifier 120 (hereinafter, referred to as the classifier 120) to classify domains of the query input data 110. The classifier 120 may output, as a classification result 130, information about a domain to which the query input data 110 belongs. For example, the classifier 120 may provide a probability value that the query input data 110 belongs to a predetermined domain. For example, when the data classification system 100 is assumed to perform a function of determining one of domains A and B to which the query input data 110 belongs, the classifier 120 may output a probability value that the query input data 110 belongs to the domain A and/or a probability value that the query input data 110 belongs to the domain B.

In an example, a neural network used to form the classifier 120 may be trained in advance by supervised learning that is based on training data. The classifier 120 may be based on, for example, a deep neural network (DNN) or other various neural network structures. The DNN may include, for example, a fully connected network, a deep convolutional network, and/or a recurrent neural network. In another example, based on on-device machine learning, the classifier 120 may be trained based on the query input data 110 and the query input data 110 may also be classified. In the present disclosure, "training" may refer to machine learning of a computer.

The data classification system 100 may be used in a user verification (for example, a face recognition, an iris recognition, a fingerprint recognition, and/or a speech recognition), a liveness test, an emotion recognition, and/or an object recognition. The liveness test may be performed to determine whether a test object, which is a target for the liveness test, is live, and performed to determine whether a face in image data is a genuine face or a fake face. For example, when the data classification system 100 is used for a face recognition, the data classification system 100 may determine whether a face image input as the query input data 110 belongs to a face image of a registered user. In an example, the face image of the registered user forms a single domain. The classifier 120 may provide a probability value that a face in the face image corresponds to a face of the registered user.

In another example, the data classification system 100 may generate new data based on the query input data 110. The data classification system 100 may generate query data belonging to a domain different from the domain of the query input data 110. To generate query data 150 in a different domain, the data classification system 100 may use a generator 140 that is based on a neural network. The generator 140 may generate query data 150 in a domain different from the domain of the query input data 110, based on the query input data 110. For example, when query input data 110 of a domain A may be input, the generator 140 may generate query data belonging to a domain B. In another example, when query input data 110 of a domain B may be input, the generator 140 may generate query data belonging to a domain A. Thus, the generator 140 may perform a translation of data between domains. For example, when a face image is input as query input data 110, the generator 140 may generate a face image in another domain. For example, a first domain may be "person A" and a second domain may be "person B," and, e.g., when a genuine face image of person A is input as query input data 110, the generator 140 may generate a fake face image of person B. In other examples, a first domain may be "cat" and a second domain may be "dog," or a first domain may be "Artist A" and a second domain may be "Artist B" As shown, a domain may be a category of image classification, wherein a first domain and a second domain may be distinct categories corresponding to a common overall category such as "face," "animal," or "artist." The query data 150 generated as described above may be used to train the classifier 120 and the generator 140 in, for example, on-device machine learning.

Hereinafter, a method of training the classifier 120 and the generator 140 used in the data classification system 100 will be described. Through the method, the classifier 120 may robustly classify data belonging to domains that are difficult to be distinguished and may also robustly classify data belonging to domains with a small number of samples of training data.

Figure 2:
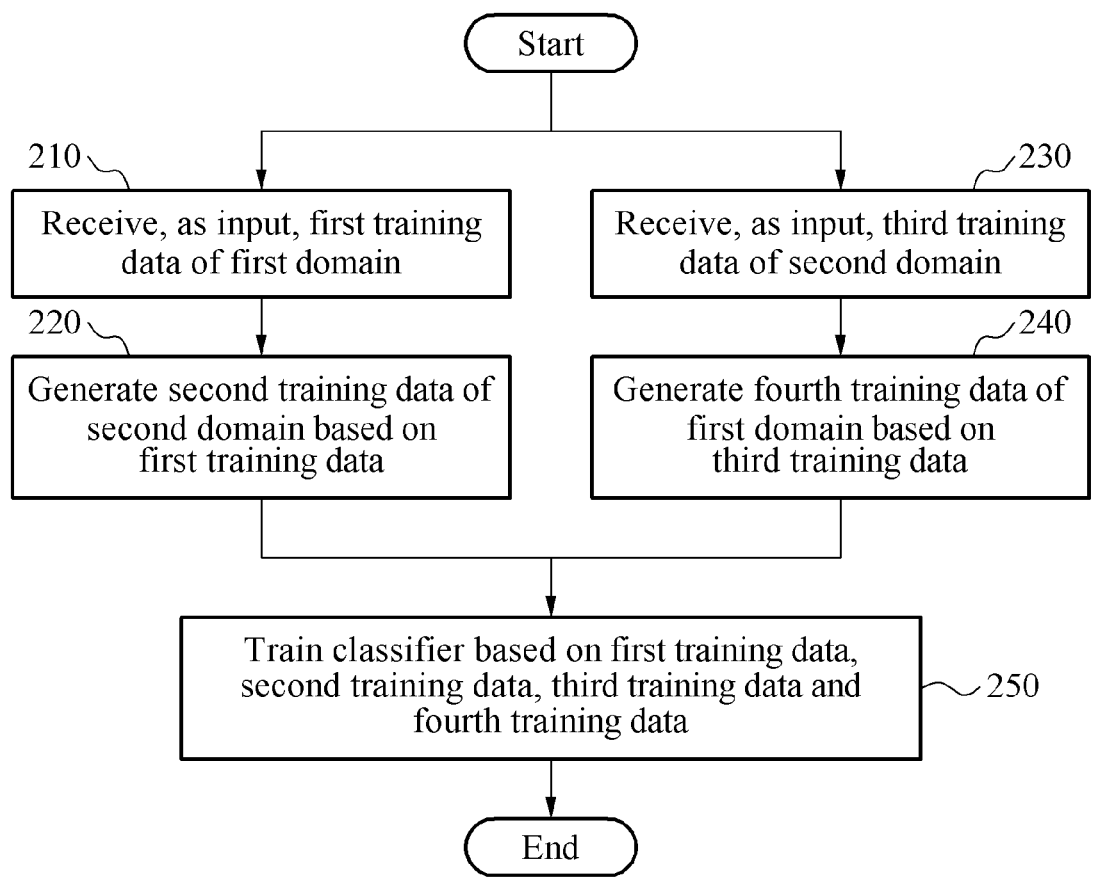
FIG. 2 is a flowchart illustrating an example of a method of training a classifier.

FIG. 2 is a flowchart illustrating an example of a method of training a classifier. The method may be performed by, for example, a training apparatus (for example, a training apparatus 800 of FIG. 8) that will be described below. Although a process of training a classifier to properly determine which one of a first domain and a second domain includes training data is described with reference to FIGS. 2 and 3 for convenience of description, examples are not limited thereto. Depending on examples, the classifier may also be trained on at least three domains.

Referring to FIG. 2, in operation 210, first training data of a first domain may be input to the training apparatus. In operation 220, the training apparatus may generate second training data of a second domain, distinguished from the first domain, based on the first training data. The training apparatus may generate the second training data using a first generator that is based on a neural network and that uses the first training data as an input. The first generator may be, for example, a neural network trained to generate second training data of a domain different from a domain with input first training data.

In operation 230, third training data of the second domain may be input to the training apparatus. In operation 240, the training apparatus may generate fourth training data of the first domain, distinguished from the second domain, based on the third training data. The training apparatus may generate the fourth training data using a second generator that is based on a neural network and that uses the third training data as an input. The second generator may be, for example, a neural network trained to generate fourth training data of a domain different from a domain with input third training data.

In operation 250, the training apparatus may train a classifier based on the first training data, the second training data, the third training data and the fourth training data. For example, the training apparatus may train the classifier so that the classifier properly distinguishes the first training data and fourth training data belonging to the first domain from the second training data and third training data belonging to the second domain. The above process of training the classifier may include a process of calculating a loss based on a feature value output from the classifier, setting a cost function based on the loss and updating parameters of the classifier to reduce the loss using the cost function. In another example, the training apparatus may set a cost function based on a feature value output from the classifier, and may train the first generator and the second generator as well as the classifier, based on the cost function. As described above, the training apparatus may train the classifier based on original data of the first training data and third training data together with the second training data and fourth training data that are newly generated.

Figure 3:
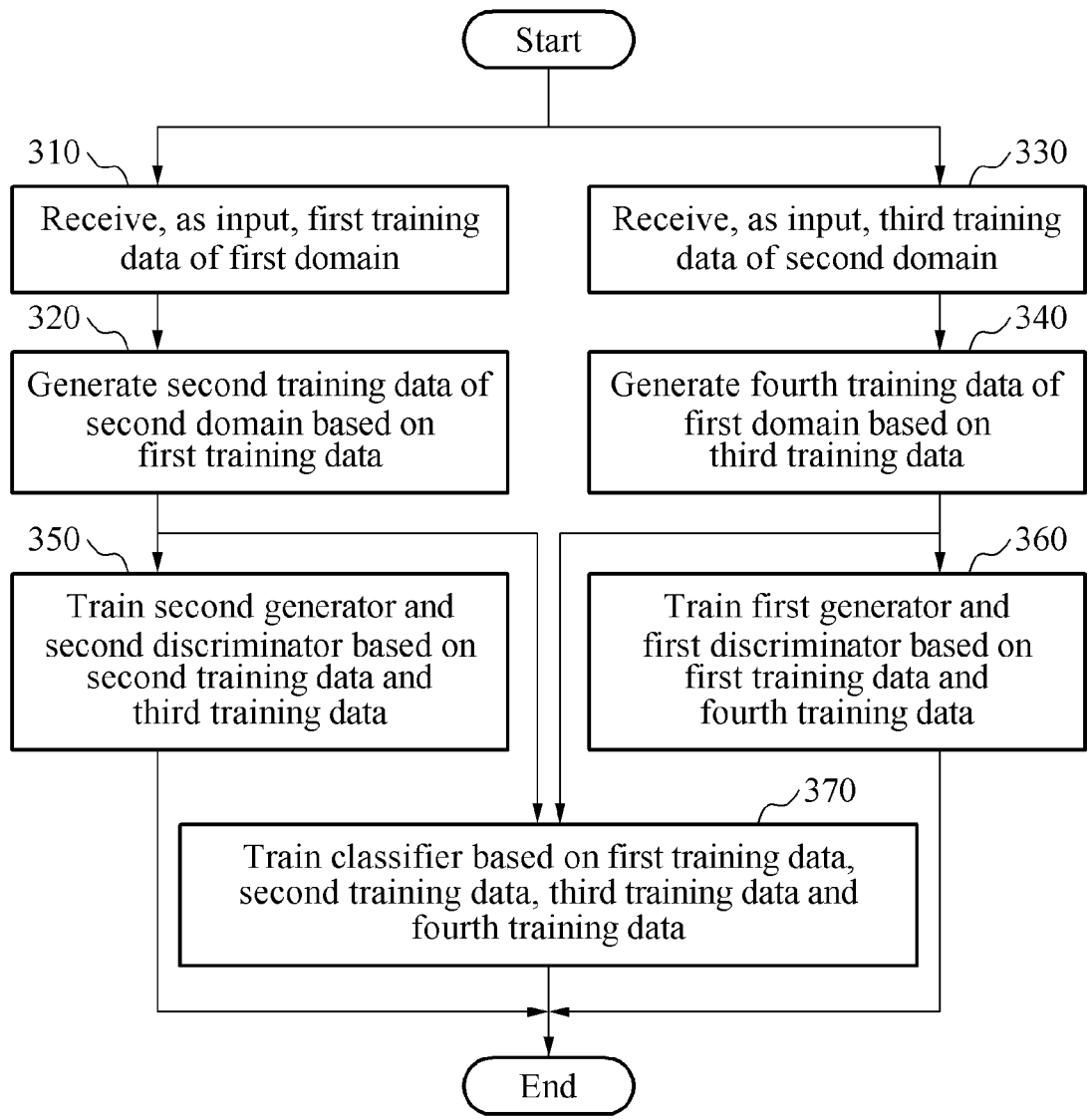
FIG. 3 is a flowchart illustrating an example of a method of training a classifier.

FIG. 3 is a flowchart illustrating an example of a method of training a classifier.

Referring to FIG. 3, in operation 310, first training data of a first domain may be input to the training apparatus. In operation 320, the training apparatus may generate second training data of a second domain based on the first training data. In operation 330, third training data of the second domain may be input to the training apparatus. In operation 340, the training apparatus may generate fourth training data of the first domain based on the third training data. In operation 370, the training apparatus may train the classifier based on the input first training data, the generated second training data, the input third training data and the generated fourth training data. Operations 310, 320, 330, 340 and 370 respectively correspond to operations 210, 220, 230, 240 and 250 of FIG. 2, and thus detailed description thereof is not repeated herein.

The method of FIG. 3 further may include training a generator and/or a discriminator. As described above, the generator may be, for example, a neural network configured to generate data of a domain different from a domain of input data. The discriminator may be, for example, a neural network configured to determine whether input data is genuine data input to the training apparatus or fake data generated by the generator. The generator and the discriminator may operate as adversarial neural networks, and may have performance enhanced through a training process. In the training process, the generator may be trained to generate fake data closer to genuine data, and the discriminator may be trained to properly distinguish genuine data from fake data.

In operation 360, the training apparatus may train a first generator and a first discriminator based on the first training data and fourth training data that belong to the first domain. In operation 350, the training apparatus may train a second generator and a second discriminator based on the second training data and third training data that belong to the second domain.

As described above with reference to FIG. 2, the first generator may translate the input first training data of the first domain into the second training data of the second domain and may output the second training data, and the second generator may translate the input third training data of the second domain into the fourth training data of the first domain and may output the fourth training data. For example, the training apparatus may set a cost function based on a difference between the first training data input to the training apparatus and the fourth training data generated by the second generator, and may adjust parameters of the first generator based on the set cost function. Similarly, the training apparatus may set a cost function based on a difference between the third training data input to the training apparatus and the second training data generated by the first generator, and may adjust parameters of the second generator based on the set cost function.

The first discriminator may receive, as an input, training data of the second domain, and may determine whether the input training data is genuine data input to the training apparatus or fake data generated by the first generator. For example, the training apparatus may train the first discriminator so that an expectation value that the third training data is to be determined as genuine data when the first discriminator receives the third training data reaches a maximum value, and so that an expectation value that the second training data generated by the first generator is to be determined as fake data when the first discriminator receives the second training data reaches a maximum value.

The second discriminator may receive, as an input, training data of the first domain, and may determine whether the input training data is genuine data input to the training apparatus or fake data generated by the second generator. For example, the training apparatus may train the second discriminator so that an expectation value that the first training data is to be determined as genuine data when the second discriminator receives the first training data reaches a maximum value, and so that an expectation value that the fourth training data generated by the second generator is to be determined as fake data when the second discriminator receives the fourth training data reaches a maximum value.

Figure 4:
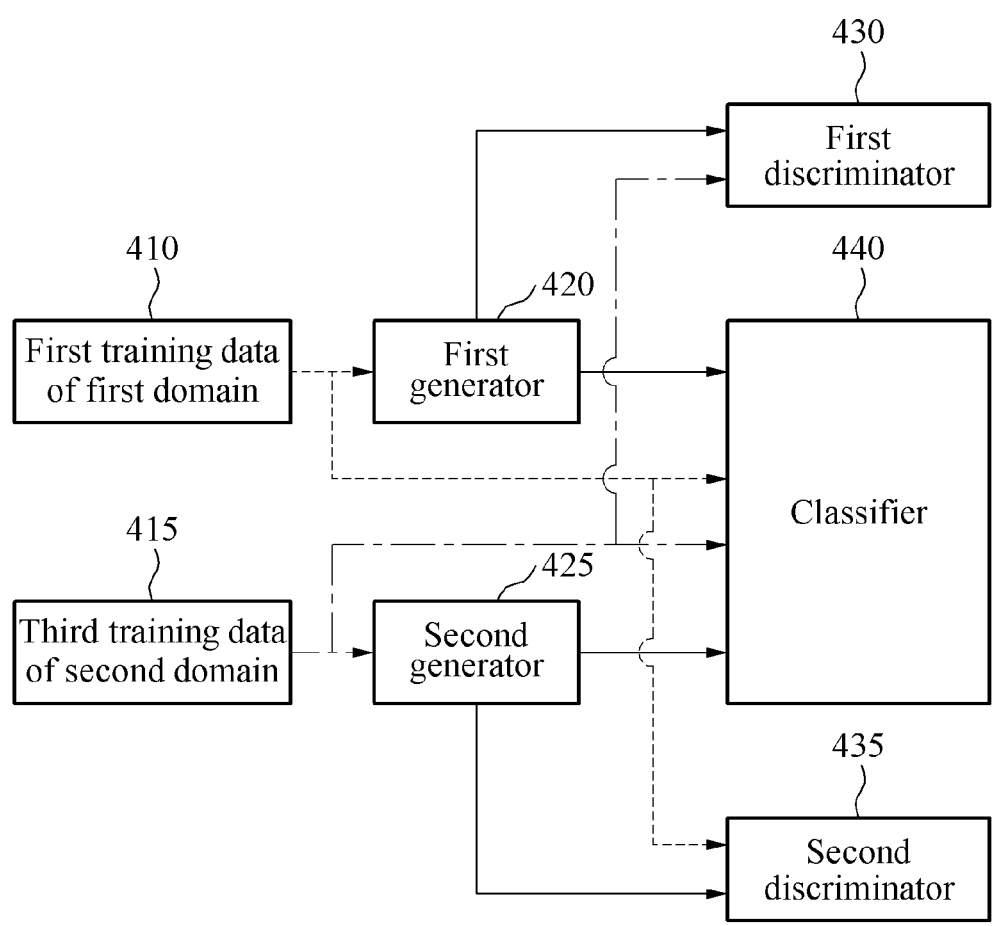
FIG. 4 illustrates an example of a training system.

FIG. 4 illustrates an example of a training system 400.

Referring to FIG. 4, the training system 400 may include a first generator 420, a second generator 425, a first discriminator 430, a second discriminator 435 and a classifier 440. A training process and an input and output of each of the first generator 420, the second generator 425, the first discriminator 430, the second discriminator 435 and the classifier 440 may be controlled by a training apparatus described in the present disclosure. The first discriminator 430, the second discriminator 435 and the classifier 440 may be separate from each other, and thus the first discriminator 430, the second discriminator 435 and the classifier 440 may be based on independent neural networks.

Figure 5:
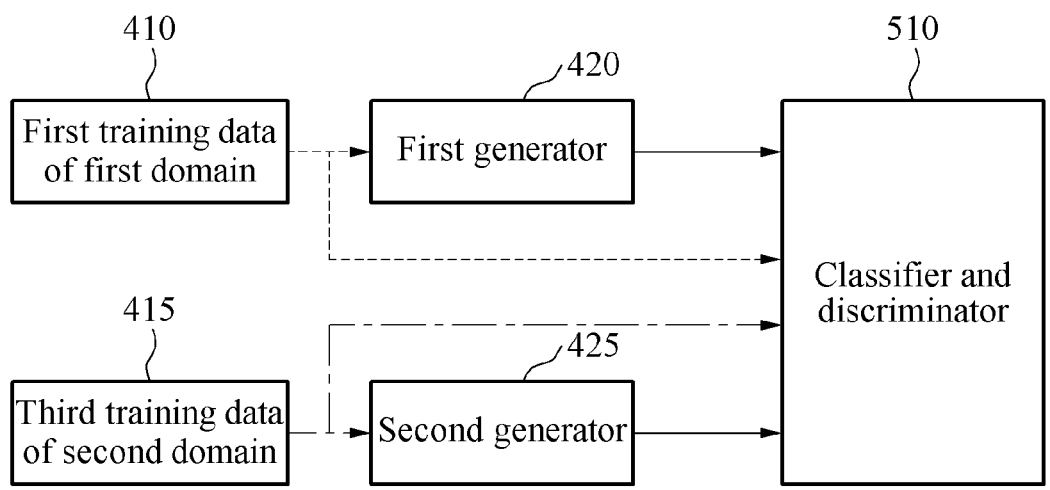
FIG. 5 illustrates an example of a training system.

In another example, the first discriminator 430, the second discriminator 435 and the classifier 440 may be implemented as a single neural network. In a training system 500 of FIG. 5, the first discriminator 430, the second discriminator 435 and the classifier 440 of FIG. 4 may be combined into a classifier and discriminator 510. The classifier and discriminator 510 may be based on a single neural network and may perform all functions of the first discriminator 430, the second discriminator 435 and the classifier 440 of FIG. 4.

Referring back to FIG. 4, first training data 410 of a first domain may be input to the first generator 420, and the first generator 420 may generate second training data of a second domain based on the first training data 410. Third training data 415 of the second domain may be input to the second generator 425, and the second generator 425 may generate fourth training data of the first domain based on the third training data 415.

The first discriminator 430 may receive, as an input, the third training data 415 of the second domain, and may provide a probability value indicating whether the third training data 415 is genuine data or fake data. Also, the first discriminator 430 may receive, as an input, the second training data of the second domain generated by the first generator 420, and may provide a probability value indicating whether the second training data is genuine data or fake data.

Similarly to the first discriminator 430, the second discriminator 435 may receive, as an input, the first training data 410 of the first domain, and may provide a probability value indicating whether the first training data 410 is genuine data or fake data. Also, the second discriminator 435 may receive, as an input, the fourth training data of the first domain generated by the second generator 425, and may provide a probability value indicating whether the fourth training data is genuine data or fake data.

In an example, the training apparatus may train the first generator 420 so that an expectation value that the second training data generated by the first generator 420 is to be determined as fake data by the first discriminator 430 reaches a minimum value. Also, the training apparatus may train the second generator 425 so that an expectation value that the fourth training data generated by the second generator 425 is to be determined as fake data by the second discriminator 435 reaches a minimum value. The training apparatus may perform training so that an expectation value defined as shown in Equation 1 below is minimized.

$$E[\log P(s=\text{fake}|\tilde{X})] \quad \text{Equation 1}$$

In Equation 1, $\tilde{X}$ denotes the generated second training data (or the generated fourth training data), $P(s=\text{fake}|\tilde{X})$ denotes a probability value that $\tilde{X}$ is to be determined as fake data by the first discriminator 430 (or the second discriminator 435), and $E[x]$ denotes an expectation value for x (e.g., $E[\log P(s=\text{fake}|\tilde{X})]$ denotes an expectation value that $\tilde{X}$ is to be determined as fake data).

In another example, the training apparatus may train the second generator 425 to minimize a difference between the original data (that is, the first training data 410 of the first domain) and fifth training data of the first domain generated by the second generator 425 when the second training data of the second domain generated based on the first training data 410 is input to the second generator 425. Similarly, the training apparatus may train the first generator 420 to minimize a difference between the original data (that is, the third training data 415 of the second domain) and sixth training data of the second domain generated by the first generator 420 when the fourth training data of the first domain generated based on the third training data 415 is input to the first generator 420. The above differences correspond to cycle consistency losses.

For example, the training apparatus may train the first discriminator 430 to minimize a sum of an expectation value that the third training data 415 of the second domain is to be determined as genuine data by the first discriminator 430 and an expectation value that the second training data of the second domain is to be determined as fake data by the first discriminator 430. Also, the training apparatus may train the second discriminator 435 to minimize a sum of an expectation value that the first training data 410 of the first domain is to be determined as genuine data by the second discriminator 435 and an expectation value that the fourth training data of the first domain is to be determined as fake data by the second discriminator 435. The training apparatus may perform training so that a sum of expectation values defined as shown in Equation 2 below is minimized.

$$E[\log P(s=\text{real}|X)] + E[\log P(s=\text{fake}|\tilde{X})] \quad \text{Equation 2}$$

In Equation 2, X denotes the third training data 415 (or the first training data 410), $P(s=\text{real}|X)$ denotes a probability value that X is to be determined as genuine data by the first discriminator 430 (or the second discriminator 435), $\tilde{X}$ denotes the generated second training data (or the generated fourth training data), $P(s=\text{fake}|\tilde{X})$ denotes a probability value that is to be determined as fake data by the first discriminator 430 (or the second discriminator 435), and $E[x]$ denotes an expectation value for x (e.g., $E[\log P(s=\text{real}|X)]$ denotes an expectation value that X is to be determined as genuine data, and $E[\log P(s=\text{fake}|\tilde{X})]$ denotes an expectation value that $\tilde{X}$ is to be determined as fake data).

By the above training method, performances of the first generator 420, the second generator 425, the first discriminator 430 and the second discriminator 435 may be enhanced together. Although two domains are used in the above training method, the training method is also applicable to at least three domains.

The classifier 440 may identify and may recognize a domain of input data. The training apparatus may train the classifier 440, the first generator 420 and the second generator 425 based on the first training data 410, the second training data, the third training data 415, and the fourth training data. The classifier 440 may be trained to properly distinguish data of the first domain from data of the second domain. The first generator 420 and the second generator 425 may be trained so that the second training data generated by the first generator 420 and the fourth training data generated by the second generator 425 are properly distinguished from each other. For example, the training apparatus may train the classifier 440, the first generator 420 and the second generator 425 so that a sum of expectation values defined as shown in Equation 3 below reaches a maximum value.

$$E[\log P(Y=A|D_A)] + E[\log P(Y=B|D_B)] + E[\log P(Y=A|\tilde{D}_A)] + E[\log P(Y=B|e, otl\ D_B)] \quad \text{Equation 3}$$

In Equation 3, $D_A$ and $D_B$ denote the first training data 410 and the third training data 415, respectively. $\tilde{D}_A$ denotes the fourth training data generated by the second generator 425, and $\tilde{D}_B$ denotes the second training data generated by the first generator 420. $P(Y=A|D_A)$ denotes a probability value that the first training data 410 is to be classified into the first domain by the classifier 440 when the first training data 410 is input to the classifier 440, and $P(Y=B|D_B)$ denotes a probability value that the third training data 415 is to be classified into the second domain by the classifier 440 when the third training data 415 is input to the classifier 440. $P(Y=A|D_A)$ denotes a probability value that the fourth training data is to be classified into the first domain by the classifier 440 when the fourth training data is input to the classifier 440, and $P(Y=A|D_B)$ denotes a probability value that the second training data is to be classified into the second domain by the classifier 440 when the second training data is input to the classifier 440. $E[x]$ denotes an expectation value for x (e.g., $E[\log P(Y=A|D_A)]$ denotes an expectation value that $D_A$ is to be classified into the first domain by the classifier 440 when the first training data 410 is input to the classifier 440, $E[\log P(Y=A|D_B)]$ denotes an expectation value that $D_B$ is to be classified into the second domain by the classifier 440 when the third training data 415 is input to the classifier 440, $E[\log P(Y=A|\tilde{D}_A)]$ denotes an expectation value that $\tilde{D}_A$ is to be classified into the first domain by the classifier 440 when the fourth training data is input to the classifier 440, and $E[\log P(Y=B|\tilde{D}_B)]$ denotes an expectation value that $\tilde{D}$ is to be classified into the second domain by the classifier 440 when the second training data is input to the classifier 440).

As described above, training data of different domains generated by the first generator 420 and the second generator 425 are used for training. When a typical classifier is trained based a small number of samples of training data due to a difficulty in collecting training data of a predetermined domain, a performance of the typical classifier 440 is limited. However, as described above, the training system 400 of the present application may generate, using generators, training data of different domains (thereby increasing a number of samples of training data), and may train the classifier 440 based on the increased number of samples of training data (including the initial training data and the generated training data), and thus the classifier 440 may have an improved performance compared to the typical classifier trained based on the small number of samples of training data, and the classifier 440 may properly identify data of a domain despite the initial small number of samples of training data in the domain prior to the generation of the generated training data. Also, by the above training process, the classifier 440 properly may classify data between domains that are similarly distributed.

Figure 6:
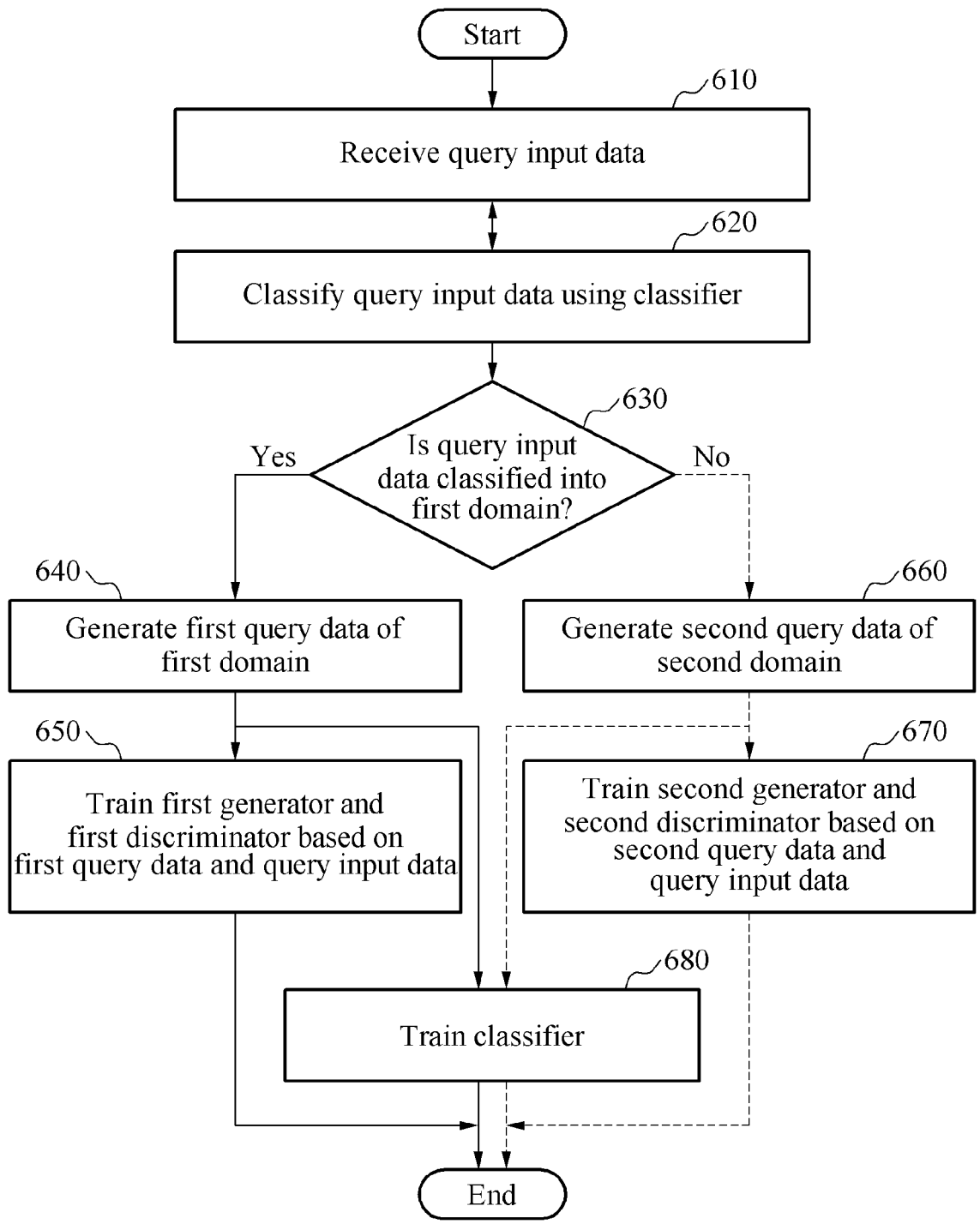
FIG. 6 is a flowchart illustrating an example of an on-device data classification method.

FIG. 6 is a flowchart illustrating an example of an on-device data classification method.

A data classification method in a situation in which a classifier is actually used for a data classification in a device may include a process of generating data, and a process of training a classifier. A data classification apparatus (for example, a data classification apparatus 900 of FIG. 9) for performing the data classification method may classify domains including query input data, may generate new data based on the query input data, and may perform machine learning based on the query input data. For example, the data classification apparatus may include the first generator 420, the second generator 425, the first discriminator 430, the second discriminator 435 and the classifier 440 of FIG. 4.

Referring to FIG. 6, in operation 610, the data classification apparatus may receive query input data. In operation 620, the data classification apparatus may determine a domain to which the query input data belongs, by classifying the query input data using a classifier that is based on a neural network. For example, the data classification apparatus may determine whether the query input data belongs to a first domain or a second domain. The classifier is, for example, a classifier that may be trained in advance by the training processes of FIGS. 2 through 5. The data classification apparatus may determine whether a category of an object in the query input data or a category corresponding to the query input data belongs to the first domain, using the classifier 440, an example of which will be further described below with reference to FIG. 7.

In operation 630, the data classification apparatus may determine whether the query input data belongs to the first domain. When the query input data is determined to belong to the first domain, the data classification apparatus may generate first query data of the first domain based on data of the second domain in operation 640. The data of the second domain may be, for example, pre-stored training data of the second domain, or query input data of the second domain classified in advance. The data classification apparatus may generate the first query data of the first domain by inputting data of the second domain to the second generator 425.

When the query input data is determined to belong to the second domain in operation 630, the data classification apparatus may generate second query data of the second domain based on data of the first domain in operation 660. The data of the first domain is, for example, pre-stored training data of the first domain, or query input data of the first domain classified in advance. The data classification apparatus may generate the second query data of the second domain by inputting data of the first domain to the first generator 420.

In the present example, the query input data corresponds to genuine data, whereas first query data and second query data generated by the first generator 420 and the second generator 425 correspond to fake data.

When the query input data is classified into the first domain and when the first query data is generated, the data classification apparatus may train the first generator 420 and the first discriminator 430 based on the first query data and the query input data in operation 650. When the query input data is classified into the second domain and when the second query data is generated, the data classification apparatus may train the second generator 425 and the second discriminator 435 based on the second query data and the query input data in operation 670. In operation 680, the data classification apparatus may train the classifier 440 based on the query input data, the first query data and the second query data. The above description of FIG. 4 is also applicable to a process of training the first generator 420, the second generator 425, the first discriminator 430, the second discriminator 435 and the classifier 440, and thus further description of the process is not repeated herein. The data classification apparatus may classify domains including next query input data, using the trained classifier 440.

Figure 7:
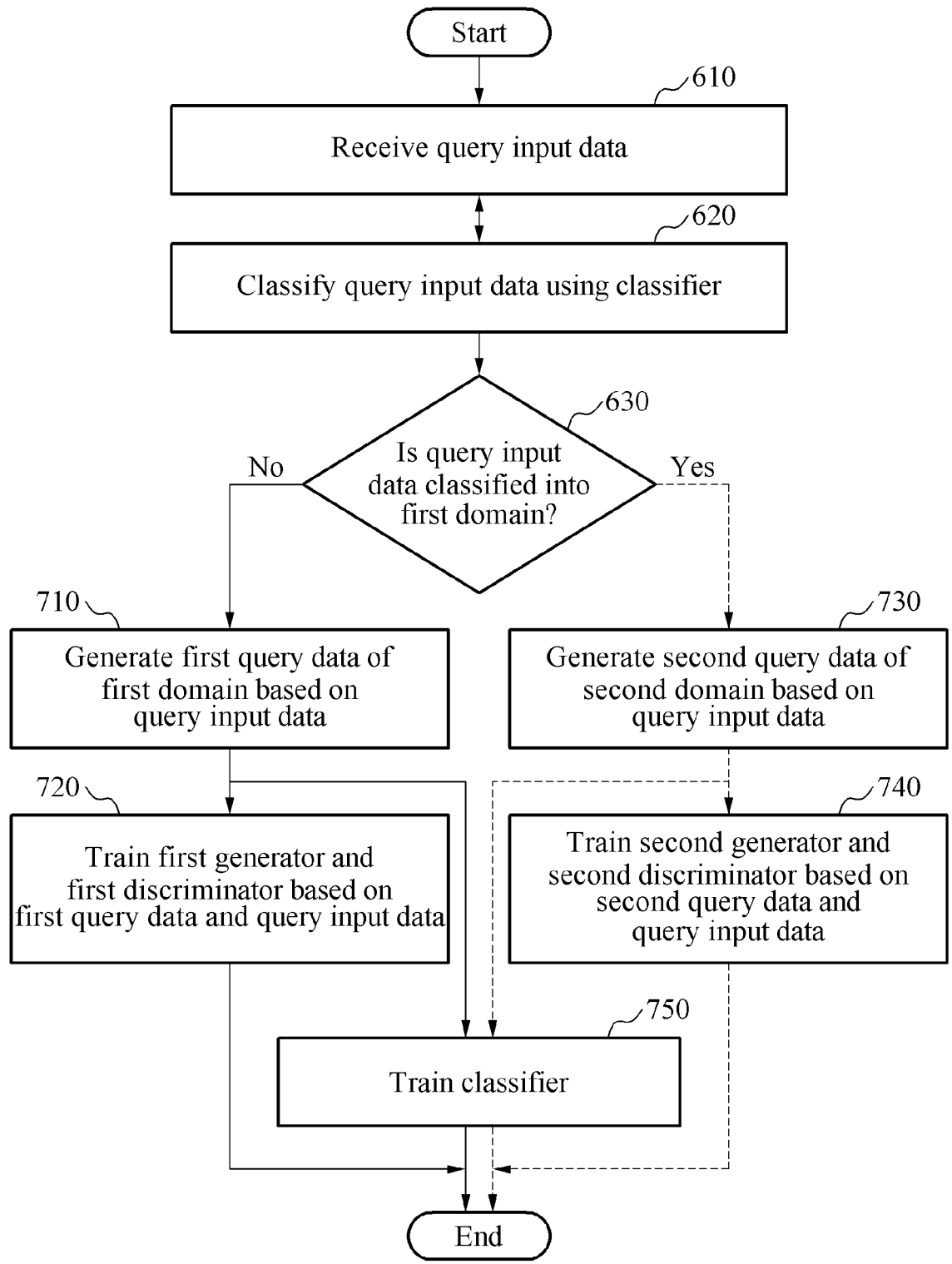
FIG. 7 is a flowchart illustrating an example of an on-device data classification method.

FIG. 7 is a flowchart illustrating an example of an on-device data classification method.

Referring to FIG. 7, in an example, operations 610, 620 and 630 are the same as operations 610 through 630 of FIG. 6. When query input data is not classified into a first domain (that is, when the query input data belongs to a second domain), the data classification apparatus may generate first query data of the first domain based on the query input data in operation 710. The data classification apparatus may generate the first query data using the second generator 425 that is based on a neural network and that uses the query input data as an input.

When the query input data is classified into the first domain (that is, when the query input data belongs to the first domain), the data classification apparatus may generate second query data of the second domain based on the query input data in operation 730. The data classification apparatus the may generate second query data using the first generator 420 that is based on a neural network and that uses the query input data as an input.

When the query input data is classified into the second domain and when the first query data is generated, the data classification apparatus may train the first generator 420 and the first discriminator 430 based on the first query data and query input data in operation 720. When the query input data is classified into the first domain and when the second query data is generated, the data classification apparatus may train the second generator 425 and the second discriminator 435 based on the second query data and query input data in operation 740. In operation 750, the data classification apparatus may train the classifier 440 based on the query input data, the first query data and the second query data. The data classification apparatus may determine a domain to which next query input data belongs, using the trained classifier 440.

In an example, the data classification apparatus may be used for a liveness test method. In this example, the data classification apparatus may receive a query face image as query input data in operation 610. In operation 620, the data classification apparatus may perform a liveness test of the query face image by classifying the query face image using the classifier 440 that is based on a neural network. In operation 630, the data classification apparatus may determine, through the liveness test, whether a face in the query face image is a genuine face or a fake face. Based on a result of the liveness test, the data classification apparatus may determine (or may classify) the face in the query face image as a genuine face (that is, the first domain). When the face in the query face image is determined as a genuine face, the data classification apparatus may generate a fake face image representing a fake face based on the query face image in operation 730. The generated fake face image corresponds to the second query data of the second domain. The data classification apparatus may generate the fake face image using the first generator 420 that is based on a neural network and that may use the query face image as an input. In operation 740, the data classification apparatus may train the second generator 425 and the second discriminator 435 based on the query face image and the generated fake face image. In operation 750, the data classification apparatus may train the classifier 440 based on the query face image and the fake face image.

In another example, the data classification apparatus may be used to classify categories between similar objects, for example, a dog and a cat. In operation 610, the data classification apparatus may receive an input image obtained by capturing a cat as query input data. In operation 620, the data classification apparatus may perform a process of classifying an input image by determining whether an object in the input image corresponds to a cat or a dog, using the classifier 440. In this example, "cat" and "dog" respectively correspond to the first domain and the second domain. The classifier 440 may provide probability information that an object in an image corresponds to a cat and/or probability information that the object corresponds to a dog, and the data classification apparatus may determine a category or domain (for example, a cat or a dog) of the object in the image based on the probability information acquired from the classifier 440.

When the object in the input image is classified as a cat in operation 630, the data classification apparatus may generate an image representing a dog as second query data of the second domain based on the input image in operation 730. The data classification apparatus may generate the image representing the dog using the first generator 420 that uses the input image as an input. The data classification apparatus may train the second generator 425 and the second discriminator 435 based on the input image and the generated image in operation 740, and may train the classifier 440 based on the input image and the generated image in operation 750.

In still another example, the data classification apparatus may be used to classify predetermined categories of objects, for example, to classify paintings of a specific artist. In operation 610, the data classification apparatus may receive an input image for a painting as query input data. In operation 620, the data classification apparatus may determine, using the classifier 440, whether a painting in the input image is a painting by an artist "A" or another artist "B". In this example, the painting by the artist "A" corresponds to the first domain, and a painting by the other artist "B" corresponds to the second domain. In operation 630, the data classification apparatus may determine whether the painting in the input image is classified as a painting by the artist "A". When the painting in the input image is classified as a painting by the artist "A", the data classification apparatus may generate an image (corresponding to the second query data of the second domain) representing the painting by the other artist "B", using the first generator 420 that uses the input image as an input in operation 730. The data classification apparatus may train the second generator 425, the second discriminator 435 and the classifier 440 based on the input image and the generated image.

Figure 8:
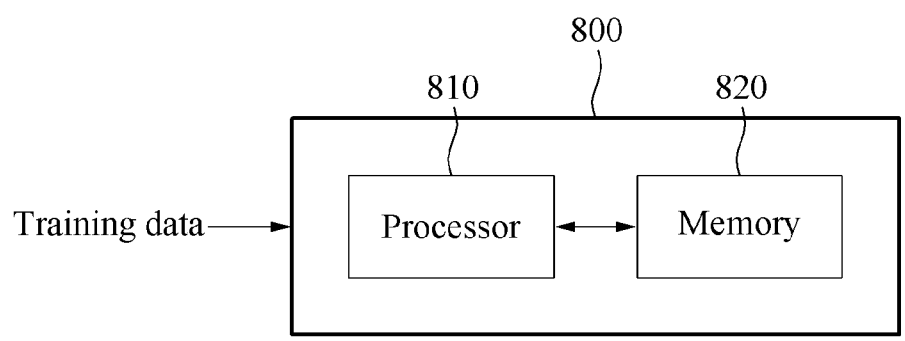
FIG. 8 illustrates an example of a configuration of a training apparatus.

FIG. 8 illustrates an example of a configuration of the training apparatus 800.

The training apparatus 800 may train a classifier based on training data. Referring to FIG. 8, the training apparatus 800 may include a processor 810 and a memory 820. The memory 820 stores instructions that are executable by the processor 810. The processor 810 may perform a process of training a classifier by executing instructions stored in the memory 820.

The processor 810 may generate, based on first training data of a first domain, second training data of a second domain. The processor 810 may generate the second training data using a first generator that is based on a neural network and that may use the first training data as an input. The processor 810 may generate, based on third training data of the second domain, fourth training data of the first domain. The processor 810 may generate the fourth training data using a second generator that is based on a neural network and that may use the third training data as an input. The processor 810 may train the classifier based on the first training data through the fourth training data. Also, the processor 810 may perform at least one operation associated with the training system and/or training apparatus described above with reference to FIGS. 2 through 5.

Figure 9:
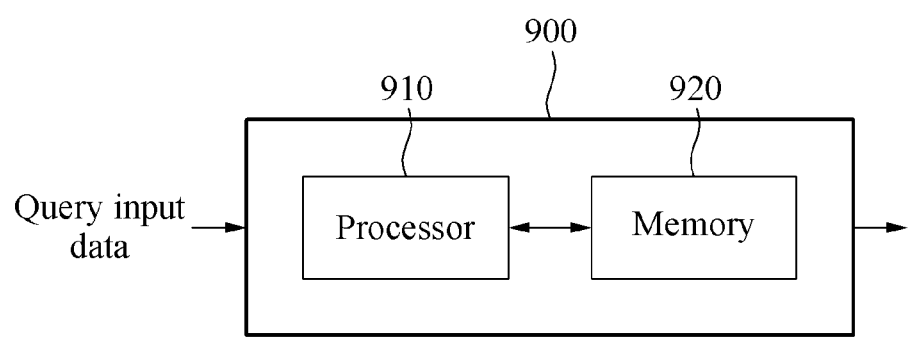
FIG. 9 illustrates an example of a configuration of a data classification apparatus.

FIG. 9 illustrates an example of a configuration of the data classification apparatus 900.

The data classification apparatus 900 may classify domains including query input data using a neural network-based classifier, or may generate query data of a domain different from a domain including query input data using a neural network-based generator. Referring to FIG. 9, the data classification apparatus 900 may include a processor 910 and a memory 920. The memory 920 stores instructions that are executable by the processor 910. The processor 910 may perform a data classification of query input data by executing instructions stored in the memory 920.

The processor 910 may receive query input data, and may determine a domain to which the query input data belongs by classifying the query input data using a classifier. Also, the processor 910 may generate query data of a domain different from a domain including query input data, using a generator. For example, when a domain including the query input data is determined as a first domain as a result of classification of domains including query input data, the processor 910 may acquire query data of a second domain from a generator that may use the query input data as an input, using the generator. Also, the processor 910 may perform at least one operation associated with the data classification system and/or data classification apparatus described above with reference to FIGS. 1, 6 and 7.

Figure 10:
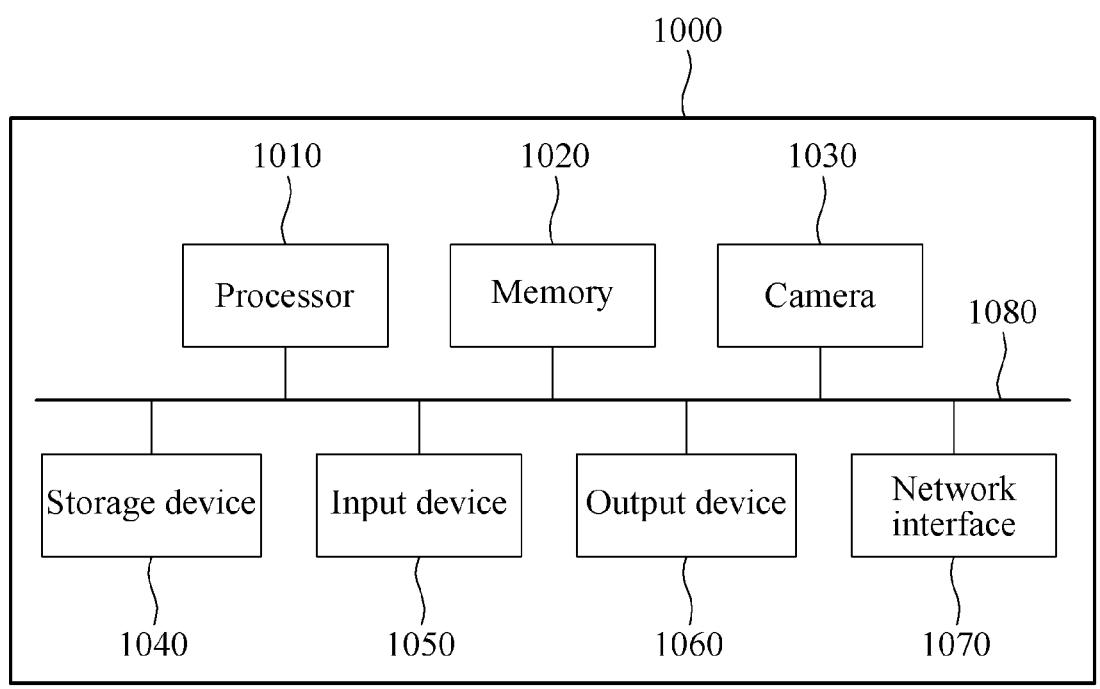
FIG. 10 illustrates an example of a configuration of a computing apparatus.

FIG. 10 illustrates an example of a configuration of a computing apparatus 1000.

The above-described data classification system may be implemented in, for example, the computing apparatus 1000. The computing apparatus 1000 may include, for example, a smartphone, a wearable device, a tablet computer, a netbook, a laptop computer, a desktop computer, a personal digital assistant (PDA), a set-top box, a home appliance, a biometric door lock, a security device, and/or a vehicle start device. The data classification system may be included in a smartphone or a home appliance, or may be embedded as a chip.

In an example, the computing apparatus 1000 may perform a user verification for a user who tries to access the computing apparatus 1000 through a facial verification. For example, when a user attempts at a user verification to cancel a lock state of the computing apparatus 1000, the computing apparatus 1000 may acquire a face image of the user using an image capturing device, for example, a camera 1030, analyzes the acquired face image, and may determine whether to cancel the lock state of the computing apparatus 1000. In this example, the data classification system may determine whether a face in the face image (corresponding to query input data) corresponds to a face (corresponding to a domain) of a registered user, using the classifier.

In another example, the computing apparatus 1000 may perform a liveness test of a query face image. When a query face image is input to the computing apparatus 1000, the computing apparatus 1000 may perform a liveness test of the query face image using the above-described classifier. The computing apparatus 1000 may determine whether a face in the query face image is a genuine face or a fake face, through the liveness test. Also, the computing apparatus 1000 may generate a fake face image representing a fake face using the above-described generator. When the face in the query face image is determined as a genuine face, the computing apparatus 1000 may generate a fake face image using a generator that is based on a neural network and that may use the query face image as an input.

Referring to FIG. 10, the computing apparatus 1000 may include a processor 1010, a memory 1020, the camera 1030, a storage device 1040, an input device 1050, an output device 1060, and a network interface 1070. The processor 1010, the memory 1020, the camera 1030, the storage device 1040, the input device 1050, the output device 1060, and the network interface 1070 may communicate with each other via a communication bus 1080.

The processor 1010 may perform functions and execute instructions within the computing apparatus 1000. For example, the processor 1010 processes instructions stored in the memory 1020 or the storage device 1040. The processor 1010 may perform at least one operation described above with reference to FIGS. 1 through 9.

The memory 1020 stores instructions to be executed by the processor 1010, and information associated with software or application during execution of the software or application by the computing apparatus 1000. The camera 1030 may acquire image data that may be used as query input data.

The storage device 1040 may include, for example, a computer-retable storage medium or a computer-retable storage device. The storage device 1040 may include, for example, a magnetic hard disk, an optical disk, a flash memory, an electrically erasable programmable read-only memory (EPROM), a floppy disk, and other types of non-volatile memories known in the art to which the examples described herein pertain.

The input device 1050 may receive an input from a user through, for example, a tactile input, a video input, an audio input, or a touch input. The input device 1050 detects the input from, for example, a keyboard, a mouse, a touchscreen, a microphone, or the user, and may include an arbitrary device configured to transfer the detected input to the computing apparatus 1000.

The output device 1060 may provide a user with an output of the computing apparatus 1000 through a visual, audio, or tactile channel. The output device 1060 may include, for example, a display, a touchscreen, a speaker, a vibration generator, or other devices configured to provide the user with the output. The network interface 1070 communicates with an external device through a wired or wireless network.

The data classification systems, training systems, training apparatuses, data classification apparatuses, computing apparatuses, generators, discriminators, classifiers, data classification system 100, training system 400, first generator 420, second generator 425, first discriminator 430, second discriminator 435, classifier 440, classifier 510, training apparatus 800, processor 810, memory 820, data classification apparatus 900, processor 910, memory 920, computing apparatus 1000, processor 1010, memory 1020, camera 1030, storage device 1040, input device 1050, output device 1060, network interface 1070, and other apparatuses, units, modules, devices, and other components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented recognition method comprising:
    receiving query input data;
    determining a domain to which the query input data belongs using a neural network-based classifier;
    in response to the query input data belonging to a first domain, generating second query data of a second domain based on the query input data; and
    in response to the query input data belonging to the second domain, generating first query data of the first domain based on the query input data by inputting the query input data to a second neural network-based generator.

2. The method of claim 1, wherein the generating of the second query data comprises generating the second query data by inputting the query input data to a first neural network-based generator.

3. The method of claim 1, further comprising:
    training the neural network-based classifier based on the query input data and the generated second query data.

4. The method of claim 3, further comprising:
    performing recognition by determining a domain to which next query input data belongs using the trained classifier.

5. The method of claim 1,
    wherein the query input data corresponds to an image sensed by one or more image sensors, and
    wherein the domain to which the query input data belongs includes a category of an object included in the image.

6. A non-transitory computer-readable storage medium storing instructions that, when executed by one or more processors, cause the one or more processors to perform the method of claim 1.

7. The method of claim 1, further comprising:
    training the neural network-based classifier based on the query input data and the generated first query data.

8. The method of claim 1, wherein the determining of the domain comprises determining, using the neural network-based classifier, whether a category of an object in the query input data or a category corresponding to the query input data belongs to the first domain.

9. A processor-implemented recognition method comprising:
    receiving a query face image;
    performing a liveness test on the query face image using a neural network-based classifier; and
    in response to a face in the query face image being determined as a genuine face based on a result of the liveness test, generating a fake face image representing a fake face based on the query face image.

10. The method of claim 9, wherein the generating of the fake face image comprises generating the fake face image using a first neural network-based generator that uses the query face image as an input.

11. The method of claim 9, further comprising:
training the neural network-based classifier based on the query face image and the generated fake face image.

12. A processor-implemented recognition training method comprising:
generating, based on first training data of a first domain, second training data of a second domain;
generating, based on third training data of the second domain, fourth training data of the first domain; and
training a classifier based on the first training data, the second training data, the third training data and the fourth training data.

13. The method of claim 12, wherein:
the generating of the second training data comprises generating the second training data by inputting the first training data to a first neural network-based generator, and
the generating of the fourth training data comprises generating the fourth training data by inputting the third training data to a second neural network-based generator.

14. The method of claim 12, wherein the training of the classifier comprises:
setting a cost function based on a feature value output from the classifier; and
training the classifier, the first neural network-based generator and the neural network-based second generator based on the cost function.

15. The method of claim 12, wherein the training of the classifier comprises training the classifier so that the classifier is configured to distinguish data of the first domain from data of the second domain.

16. A recognition apparatus comprising:
one or more processors configured to:
receive query input data;
determine a domain to which the query input data belongs using a neural network-based classifier;
in response to the query input data belonging to a first domain, generate second query data of a second domain based on the query input data; and
generate first query data of the first domain by inputting the query input data to a second neural network-based generator, in response to the query input data belonging to the second domain.

17. The apparatus of claim 16, wherein the one or more processors are configured to generate the second query data by inputting the query input data to a first neural network-based generator.

18. The apparatus of claim 16, wherein the one or more processors are configured to determine, using the neural network-based classifier, whether a category of an object in the query input data or a category corresponding to the query input data belongs to the first domain.

* * * * *